(12) United States Patent
Choi

(10) Patent No.: US 9,284,878 B2
(45) Date of Patent: Mar. 15, 2016

(54) VARIABLE COMPRESSION RATIO DEVICE AND INTERNAL COMBUSTION ENGINE USING THE SAME

(71) Applicants: Hyundai Motor Company, Seoul (KR); Kia Motors Corporation, Seoul (KR)

(72) Inventor: Myungsik Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 84 days.

(21) Appl. No.: 14/097,132

(22) Filed: Dec. 4, 2013

(65) Prior Publication Data

US 2014/0165969 A1  Jun. 19, 2014

(30) Foreign Application Priority Data

Dec. 17, 2012 (KR) .......................... 10-2012-0147787

(51) Int. Cl.
*F02B 75/04* (2006.01)
*F02B 23/00* (2006.01)
*F02D 15/04* (2006.01)

(52) U.S. Cl.
CPC .............. *F02B 23/00* (2013.01); *F02B 75/042* (2013.01); *F02D 15/04* (2013.01); *Y02T 10/12* (2013.01); *Y02T 10/125* (2013.01); *Y02T 10/142* (2013.01)

(58) Field of Classification Search
CPC ........ F02B 75/042; F02B 23/00; F02D 15/04; Y02T 10/142; Y02T 10/12; Y02T 10/125
USPC .............. 123/48 A, 48 AA, 48 D, 78 A, 78 D
See application file for complete search history.

(56) References Cited

U.S. PATENT DOCUMENTS

| 2,369,738 | A | * | 2/1945 | Johnson ...................... 123/78 D |
| 2,981,243 | A | * | 4/1961 | Arndt ........................... 123/78 D |
| 5,803,026 | A | * | 9/1998 | Merritt et al. ................ 123/48 R |
| 2005/0284444 | A1 | * | 12/2005 | Sherman ........................ 123/316 |
| 2009/0114194 | A1 | * | 5/2009 | Arner .......................... 123/48 R |
| 2009/0151708 | A1 | * | 6/2009 | Schouweiler, Jr. ............ 123/668 |
| 2009/0223491 | A1 | * | 9/2009 | Syed et al. .................. 123/48 A |
| 2010/0018484 | A1 | * | 1/2010 | Choi et al. ................. 123/90.16 |

FOREIGN PATENT DOCUMENTS

| JP | 8-26777 B2 | 3/1996 |
| JP | 2009-144560 A | 7/2009 |
| KR | 0130587 B1 | 11/1997 |
| KR | 1998-047819 A | 9/1998 |
| KR | 1998-050235 A | 9/1998 |

* cited by examiner

*Primary Examiner* — Marguerite McMahon

(74) *Attorney, Agent, or Firm* — Morgan, Lewis & Bockius LLP

(57) ABSTRACT

A variable compression ratio device and an internal combustion engine are disclosed. The variable compression ratio device includes a main piston that moves in a reciprocating manner, a main combustion chamber having a volume that is varied by the main piston, a sub-compression chamber communicating with the main combustion chamber; a sub-piston configured to reciprocate in the sub-compression chamber to vary a volume of the sub-compression chamber; and a sub-piston reciprocating unit that reciprocates the sub-piston. Accordingly, the air-fuel ratio and output of the internal combustion engine can be improved.

7 Claims, 6 Drawing Sheets

VARIABLE COMPRESSION RATIO DEVICE AND INTERNAL COMBUSTION ENGINE USING THE SAME

CROSS-REFERENCE TO RELATED APPLICATION

The present application claims priority of Korean Patent Application Number 10-2012-0147787 filed Dec. 17, 2012, the entire contents of which application are incorporated herein for all purposes by this reference.

BACKGROUND OF INVENTION

1. Field of Invention

The present invention relates to a variable compression ratio device and an internal combustion engine using the same, and more particularly, to a variable compression ratio device, which varies the compression ratio by increasing or decreasing the volume of a combustion chamber, and an internal combustion engine using the same.

2. Description of Related Art

In general, the compression ratio of an internal combustion engine is represented by the largest volume of a combustion chamber prior to compression and the smallest volume of the combustion chamber after compression in a compression stroke of the internal combustion engine.

The output of the internal combustion engine increases as the compression ratio of the internal combustion engine is increased. However, if the compression ratio of the internal combustion engine is too high, so-called knocking occurs, and this event decreases the output of the internal combustion engine and also results in overheating of the internal combustion engine, a failure in a valve or piston of the internal combustion engine, and so on.

Accordingly, the compression ratio of the internal combustion engine is set to a specific value within an appropriate range prior to the occurrence of knocking. As such, because the air-fuel ratio and output of the internal combustion engine can be improved by properly varying the compression ratio according to the load of the internal combustion engine, various approaches are being proposed to vary the compression ratio of the internal combustion engine.

These approaches for varying the compression ratio of the internal combustion engine mostly employ methods that vary the volume of the compression chamber during a compression stroke. For example, there have been proposed methods that vary the height of the top dead center of a piston during a compression stroke, or increase or decrease the volume of a sub-compression chamber provided in a cylinder head.

Varying the height of the top dead center of a piston tends to make the structure of the internal combustion engine complicated. Therefore, it will be desirable to vary the compression ratio by providing a sub-compression chamber in a cylinder head to make the structure simple and achieve great improvement in air-fuel ratio.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a variable compression ratio device having the advantage of contributing to the improvement of the air-fuel ratio and output of an internal combustion engine by providing a sub-compression chamber in a cylinder head and varying the compression ratio of a main compression chamber, and an internal combustion engine using the same.

Various aspects of the present invention provide a variable compression ratio device including a main piston that moves in a reciprocating manner; a main combustion chamber a volume of which is varied by the main piston, a sub-compression chamber communicating with the main combustion chamber, a sub-piston configured to reciprocate in the sub-compression chamber so as to vary a volume of the sub-compression chamber, and a sub-piston reciprocating unit that reciprocates the sub-piston.

The sub-compression chamber may be inclined at a predetermined angle with respect to the main compression chamber. The bottom surface of the sub-piston may be inclined at an angle substantially the same as the sub-compression chamber with respect to the main compression chamber. The sub-compression chamber may be of a cylindrical shape.

The sub-piston reciprocating unit may include a connecting rod one end of which is connected to the sub-piston, an eccentric cam coupled to the other end of the connecting rod, and a rotating unit that rotates the eccentric cam. The eccentric cam may be press-fit to the other end of the connecting rod.

The eccentric cam may be of a circular shape, and an eccentric rotary shaft may be provided in the eccentric cam to rotatably connect the eccentric cam to the rotating unit.

The rotating unit may include a worm wheel gear integrally and rotatably mounted at a tip end of the rotary shaft; a worm gear engaged with the worm wheel gear, and a driving motor connected to the worm gear to rotate the worm gear. The rotating unit may include a continuous variable valve timing apparatus having a vane integrally and rotatably mounted at a tip end of the rotary shaft.

The continuous variable valve timing apparatus may include a connecting rod whose one end is connected to the sub-piston, a crank-like rotary shaft coupled to the other end of the connecting rod; a worm wheel gear integrally and rotatably mounted at a tip end of the rotary shaft, a worm gear engaged with the worm wheel gear, and a driving motor connected to the worm gear to rotate the worm gear.

Various other aspects of the present invention provide an internal combustion engine including at least one cylinder each having the variable compression ratio device, a cylinder block which forms the cylinder, and in which a main piston is inserted and reciprocates, and a cylinder head configured to cover the cylinder block from the top, and having the sub-combustion chamber formed therein. The at least one cylinder may include four cylinders. The internal combustion engine may be an internal combustion engine using the Atkinson cycle.

In a variable compression ratio device of the present invention, a sub-combustion chamber is formed in a cylinder head to communicate with a main combustion chamber, and a sub-piston is provided in the sub-combustion chamber to vary the volume. Therefore, the compression ratio can be easily varied since the total volume of the main compression chamber and the sub-compression chamber is varied in accordance with a reciprocating stroke of the sub-piston.

With this simple structure, vehicle weight reduction and cost savings can be achieved, and the compression ratio of the internal combustion engine can be easily adjusted. As a result, the air-fuel ratio and output of the internal combustion engine can be effectively improved.

Moreover, if the present invention is applied to an internal combustion engine using the Atkinson cycle, better air-fuel ratios and torque can be attained.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
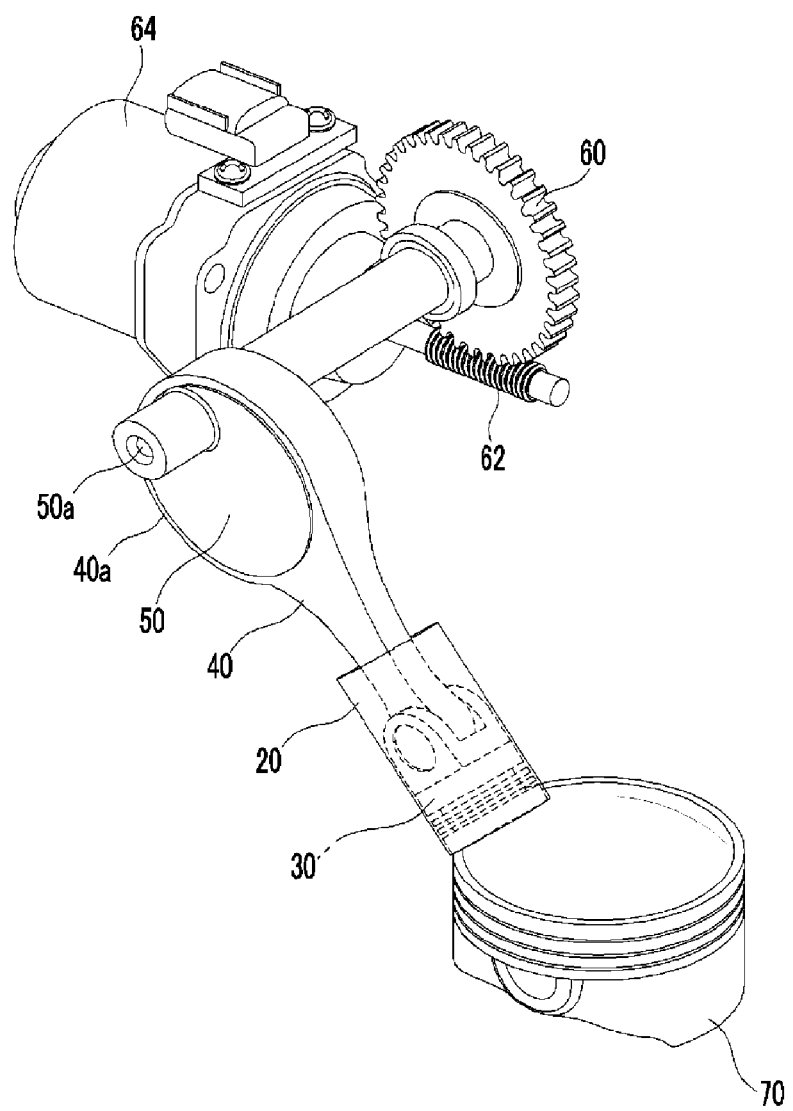
FIG. 1 is a perspective view of an exemplary variable compression ratio device according to the present invention.
Figure 2:
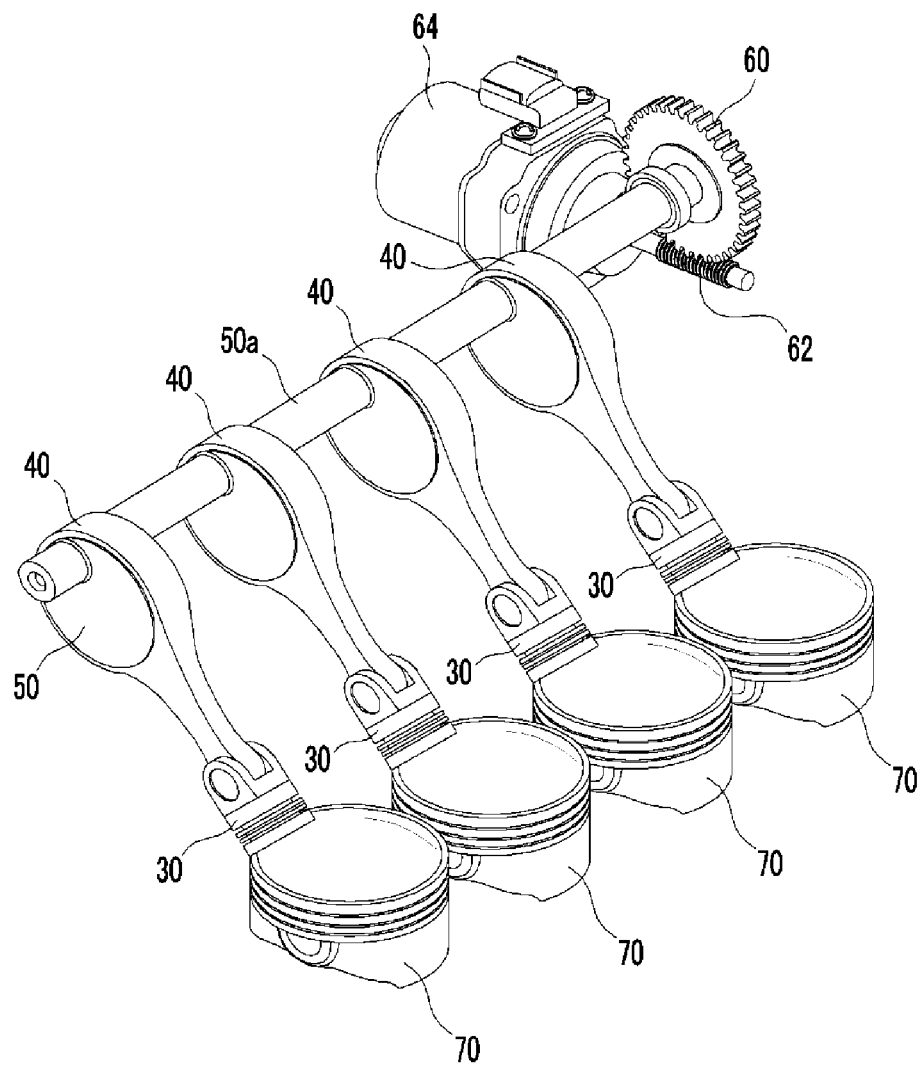
FIG. 2 is a perspective view of an exemplary variable compression ratio device applied to a four-cylinder internal combustion engine according to the present invention.
Figure 3:
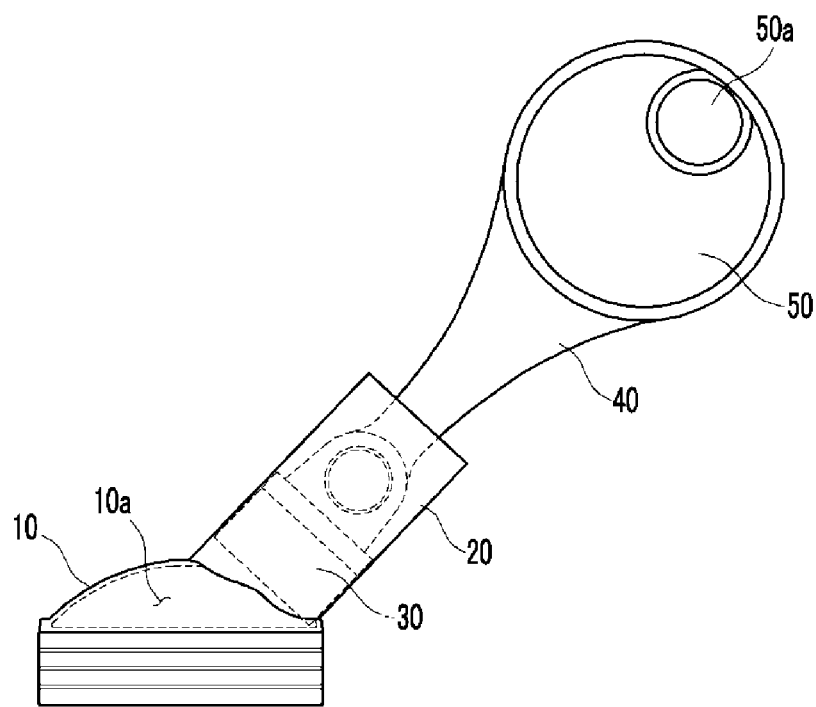
FIG. 3 is a perspective view of an exemplary crank web according to the present invention.

Referring to FIGS. 1 to 3, a sub-compression chamber 20 is formed above a cylinder head 10 forming a main compression chamber 10a so as to communicate with the main compression chamber 10a.

The sub-compression chamber 20 is inclined at a predetermined angle with respect to the main combustion chamber 10a. The sub-compression chamber 20 usually, but not necessarily, has a cylindrical shape, and may have a different shape.

A sub-piston 30 is inserted into the sub-compression chamber 20 and is movable along the length of the sub-compression chamber 20.

When the sub-piston 30 reciprocates along the length of the sub-compression chamber 20, the volume of the sub-compression chamber 20 communicating with the main compression chamber 10a is varied.

Accordingly, the total volume of the combustion chamber, which is equal to the sum of the volume of the main compression chamber 10a and the volume of the sub-compression chamber 10a, is varied, and hence the compression ratio of an internal combustion engine can be varied.

A connecting rod 40, one end of which is connected to the sub-piston 30, is provided as a reciprocating unit for reciprocating the sub-piston 30 along the length of the sub-compression chamber 20. An eccentric cam 50 is fitted and coupled to the other end of the connecting rod 40. The eccentric cam 50 is connected to be rotatable by an appropriate rotating unit.

When the eccentric cam 50 rotates by the rotating unit, the connecting rod 40 is pulled outward of the sub-compression chamber by the eccentric cam 50 in a direction of increasing the volume of the sub-compression chamber, or pushed inward of the sub-compression chamber by the eccentric cam 50 in a direction of decreasing the volume of the sub-compression chamber, whereby the volume of the sub-compression chamber is varied.

A circular coupling hole 40a is formed on the other end of the connecting rod 40, and a circular eccentric cam 50 is inserted and coupled to the coupling hole 40a. A rotary shaft 50a of the eccentric cam 50 is located to be outwardly eccentric from the center of the eccentric cam 50 and the center of the coupling hole 40a. Accordingly, when the rotary shaft 50a rotates by the rotating unit of the eccentric cam 50, the eccentric cam 50 eccentrically rotates around the rotary shaft 50a.

The rotating unit includes a worm wheel gear 60 integrally and rotatably mounted at a tip end of the rotary shaft 50a, a worm gear 62 engaged with the worm wheel gear 60, and a driving motor 64 connected to the worm gear 62 so as to rotate the worm gear 62. One will appreciate that these integral components may be monolithically formed.

Accordingly, when the driving motor 64 rotates the worm gear 62 as it is driven upon receipt of a control signal from a controller, the rotation of the worm gear 62 is transferred to the worm wheel gear 60, and the rotary shaft 50a rotates together with the rotation of the worm wheel gear 60.

Referring to FIG. 2, a variable compression ratio device of the present invention may be applied to a four-cylinder internal combustion engine. One would appreciate that a variable compression ratio device of the present invention can be applied to other internal combustion engines.

A main piston 70 is provided in each cylinder, and the volume of a main combustion chamber 10a is varied in accordance with the up-and-down movement of the main piston 70.

A sub-combustion chamber 20 is provided in the cylinder head 10 so as to communicate with the main combustion chamber 10a of each cylinder, and the sub-piston 30 is movably installed in each sub-combustion chamber 20 so as to vary the volume of the sub-combustion chamber 20.

One end of the connecting rod 40 is integrally connected to the sub-piston 30, and the eccentric cam 50 is coupled, for example, by press-fitted, to the other end of the connecting rod 40.

Each eccentric cam 50 is integrally and rotatably connected to a rotary shaft 50a, and the rotary shaft 50a is connected to a driving motor 64 through the worm wheel gear 60 and the worm gear 62. Thus, the rotary shaft 50a rotates each eccentric cam 50 upon receipt of rotary force of the driving motor 64, thereby varying the compression ratio of each cylinder. One will appreciate that the integral components may be monolithically formed.

Referring to FIG. 3, the sub-piston 30 goes down to the bottom end of the sub-compression chamber 20 by the rotation of the rotary shaft 50a, and therefore the total volume of the main compression chamber and the sub-compression chamber is mostly limited to the volume of the main compression chamber.

Consequently, the compression ratio is adjusted in accordance with the up-and-down movement of the main piston 70. As the sub-compression chamber occupies little volume in this case, the highest compression ratio is achieved when the main piston 70 goes up as high as the top dead center.

Since the sub-compression chamber 20 is inclined at a predetermined angle to the cylinder head 10, the bottom surface of the sub-piston 30 is also formed to have the same inclination angle as the sub-compression chamber 20. As such, it is possible to prevent the sub-compression chamber 20 from communicating with the main compression chamber so that the volume of the sub-compression chamber 20 in this case is nearly zero when the sub-piston 30 goes down to the lowest level.

Figure 4:
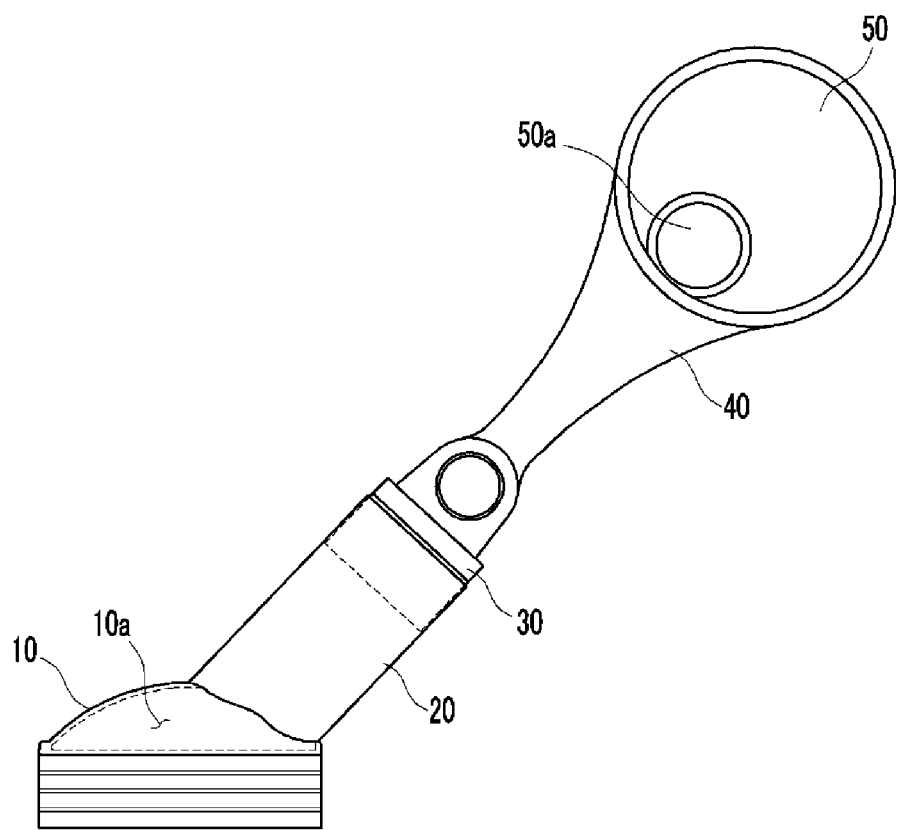
FIG. 4 illustrates the operation of an exemplary variable compression ratio device according to the present invention.

Referring to FIG. 4, the sub-piston 30 goes up as high as the top end of the sub-compression chamber 20 by the rotation of the rotary shaft 50a, and hence the total volume of the main compression chamber and the sub-compression chamber is at the highest level.

Accordingly, the compression ratio is adjusted in accordance with the up-and-down movement of the main piston 70. Since the volume of the sub-compression chamber and the volume of the main compression chamber are added to increase the total volume to the highest level, the lowest compression ratio can be achieved when the main piston 70 goes up as high as the top dead center.

Figure 5:
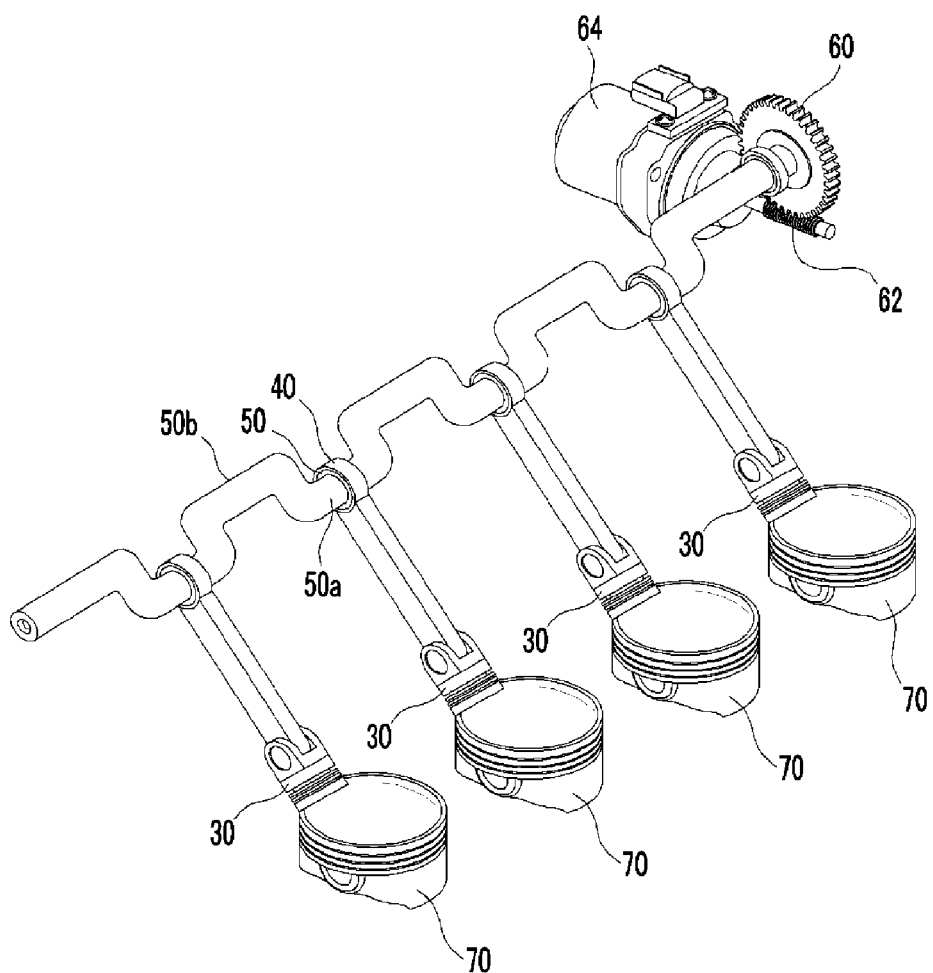
FIG. 5 is a perspective view of another exemplary variable compression ratio device applied to a four-cylinder internal combustion engine according to the present invention.

Referring to FIG. 5, while the sub-piston 30 is moved up and down by means of the connecting rod 40 and the eccentric cam 50, the sub-piston 30 may also be moved up and down by means of the connecting rod 40, by using a crank-like rotary shaft 50b and connecting the other end of the connecting rod 40 to the crank-like rotary shaft 50b.

Moreover, a continuously variable valve timing (CVVT) apparatus may be used, instead of the driving motor 64, as a way of rotating the rotary shaft 50a.

Figure 6:
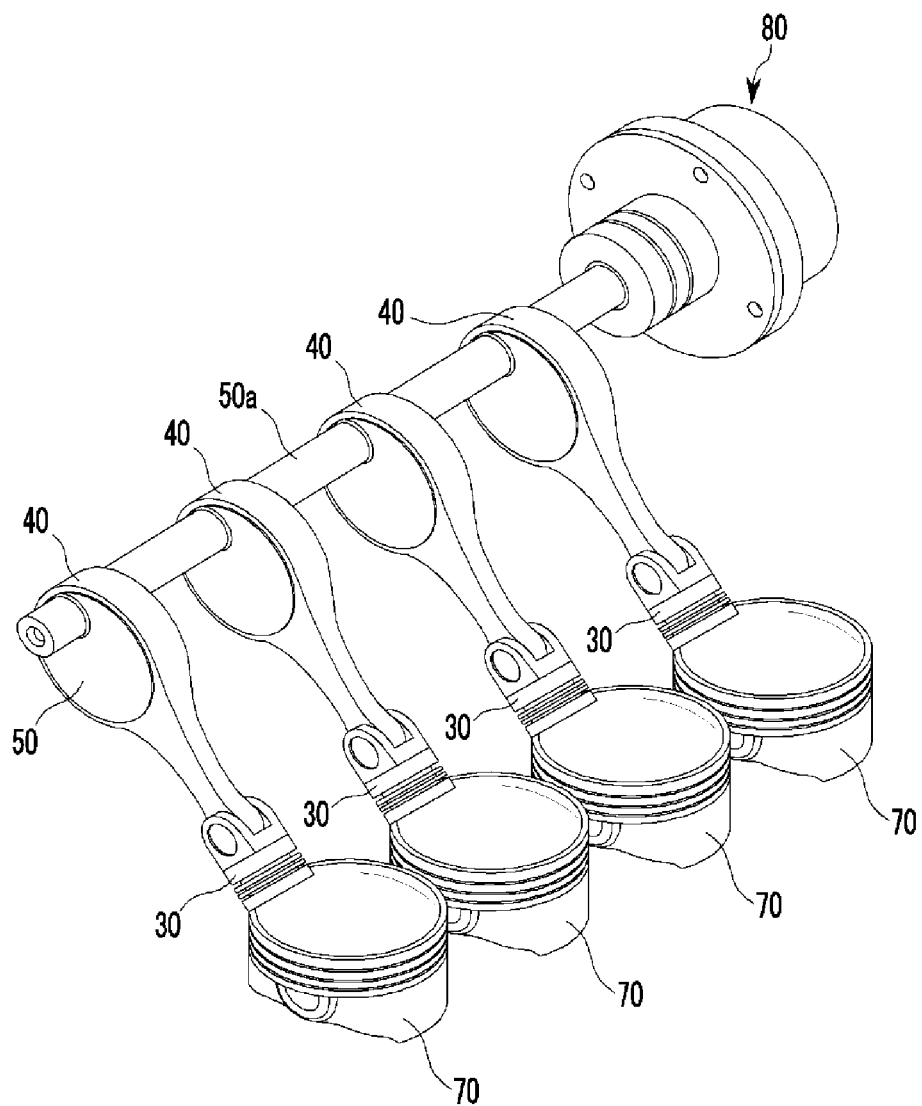
FIG. 6 is a perspective view of another exemplary variable compression ratio device applied to a four-cylinder internal combustion engine according to the present invention.

For example, as shown in FIG. 6, a vane type continuous variable valve timing apparatus 80 is installed at a tip end of the rotary shaft 50a, and a vane of the continuous variable valve timing apparatus 80 is integrally and rotatably mounted to the rotary shaft 50a. One will appreciate that these integral components may be monolithically formed.

When the vane is rotated by controlling the inflow and outflow of hydraulic fluid to and from the variable valve timing apparatus 80, the rotary shaft 50a rotates in accordance with the rotation of the vane, thereby reciprocating the sub-piston 30.

Meanwhile, if the present invention is applied to an internal combustion engine using the Atkinson cycle, better air-fuel ratios and torque can be attained.

For convenience in explanation and accurate definition in the appended claims, the terms "up" or "down", "inward" or "outward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A variable compression ratio device comprising:
   a main piston that moves in a reciprocating manner;
   a main combustion chamber, a volume thereof is varied by the main piston;
   a sub-compression chamber communicating with the main combustion chamber;
   a sub-piston configured to reciprocate in the sub-compression chamber to vary a volume of the sub-compression chamber; and
   a sub-piston reciprocating unit that reciprocates the sub-piston,
   wherein the sub-piston reciprocating unit comprises:
      a connecting rod one end thereof is connected to the sub-piston;
      an eccentric cam coupled to the other end of the connecting rod; and
   a rotating unit that rotates the eccentric cam,
   wherein the eccentric cam is of a circular shape, and
   wherein an eccentric rotary shaft is provided in the eccentric cam to rotatably connect the eccentric cam to the rotating unit.

2. The variable compression ratio device of claim 1, wherein the sub-compression chamber is inclined at a predetermined angle with respect to the main compression chamber.

3. The variable compression ratio device of claim 2, wherein a bottom surface of the sub-piston is inclined at an angle substantially the same as the sub-compression chamber with respect to the main compression chamber.

4. The variable compression ratio device of claim 1, wherein the sub-compression chamber is of a cylindrical shape.

5. The variable compression ratio device of claim 1, wherein the rotating unit comprises:
   a worm wheel gear integrally and rotatably mounted at a tip end of the rotary shaft;
   a worm gear engaged with the worm wheel gear; and
   a driving motor connected to the worm gear to rotate the worm gear.

6. The variable compression ratio device of claim 1, wherein the continuous variable valve timing apparatus comprises:
   a connecting rod whose one end is connected to the sub-piston;
   a crank-like rotary shaft coupled to the other end of the connecting rod;
   a worm wheel gear integrally and rotatably mounted at a tip end of the rotary shaft;
   a worm gear engaged with the worm wheel gear; and
   a driving motor connected to the worm gear to rotate the worm gear.

7. The internal combustion engine of claim 1, wherein the eccentric cam is press-fit to the other end of the connecting rod.

* * * * *